United States Patent [19]
Davey

[11] 3,850,067
[45] Nov. 26, 1974

[54] NOTCHING MACHINES

[76] Inventor: Sidney George Davey, 32 Estridge Way Tonbridge, Kent, England

[22] Filed: May 3, 1973

[21] Appl. No.: 356,929

[30] Foreign Application Priority Data
Sept. 27, 1972 Great Britain ............... 44524/72

[52] U.S. Cl. .................. 83/524, 83/628, 83/693, 83/917
[51] Int. Cl. ............................................. B26d 3/14
[58] Field of Search ............. 83/524, 526, 628, 632, 83/917, 693

[56] References Cited
UNITED STATES PATENTS

| 629,532 | 7/1899 | Thomas | 83/693 |
|---|---|---|---|
| 1,485,168 | 2/1924 | Cooper | 83/632 X |
| 2,035,448 | 3/1936 | Anderson | 83/628 X |
| 2,433,117 | 12/1947 | Hallander | 83/917 X |
| 2,607,421 | 8/1952 | Anderson | 83/524 X |
| 2,964,984 | 12/1960 | Schott | 83/917 X |
| 3,299,759 | 1/1967 | Johnson et al. | 83/917 X |
| 3,592,093 | 7/1971 | Cantelli | 83/917 X |
| 3,616,719 | 11/1971 | Tassie | 83/917 X |

Primary Examiner—J. M. Meister

[57] ABSTRACT

A notching machine comprising an upper notching blade removably carried by a vertical ram for shearing co-operation with a lower blade removably carried by a die plate on a work table. The ram is guided for reciprocal movement by a strong box-section ram housing secured to and extending beneath the table. The drive for the ram includes a shaft actually journalled by the ram housing itself so that notching loading is taken in a short, efficient, closed load path via the ram, the housing and the shaft. This also gives material economy, enhanced accuracy of mutual blade location, and permits a simple arrangement for blade interchangeability.

11 Claims, 4 Drawing Figures

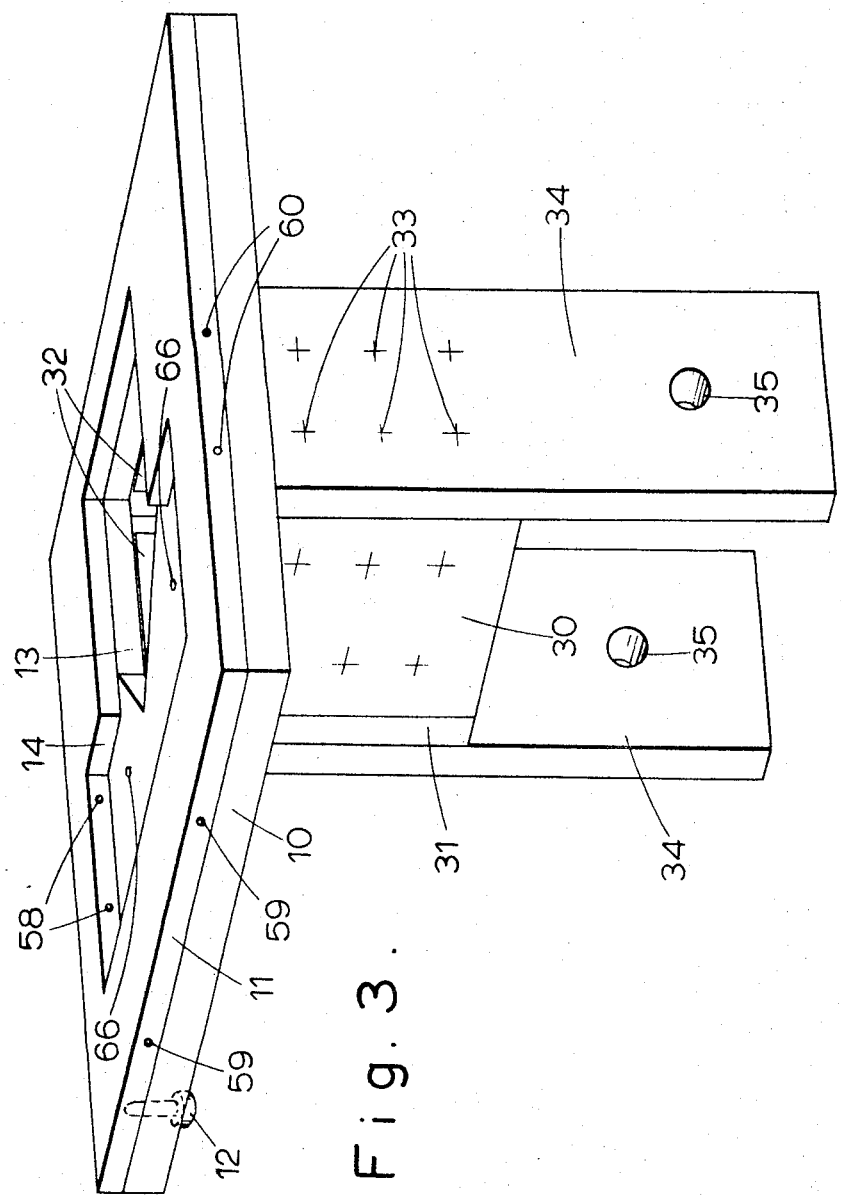

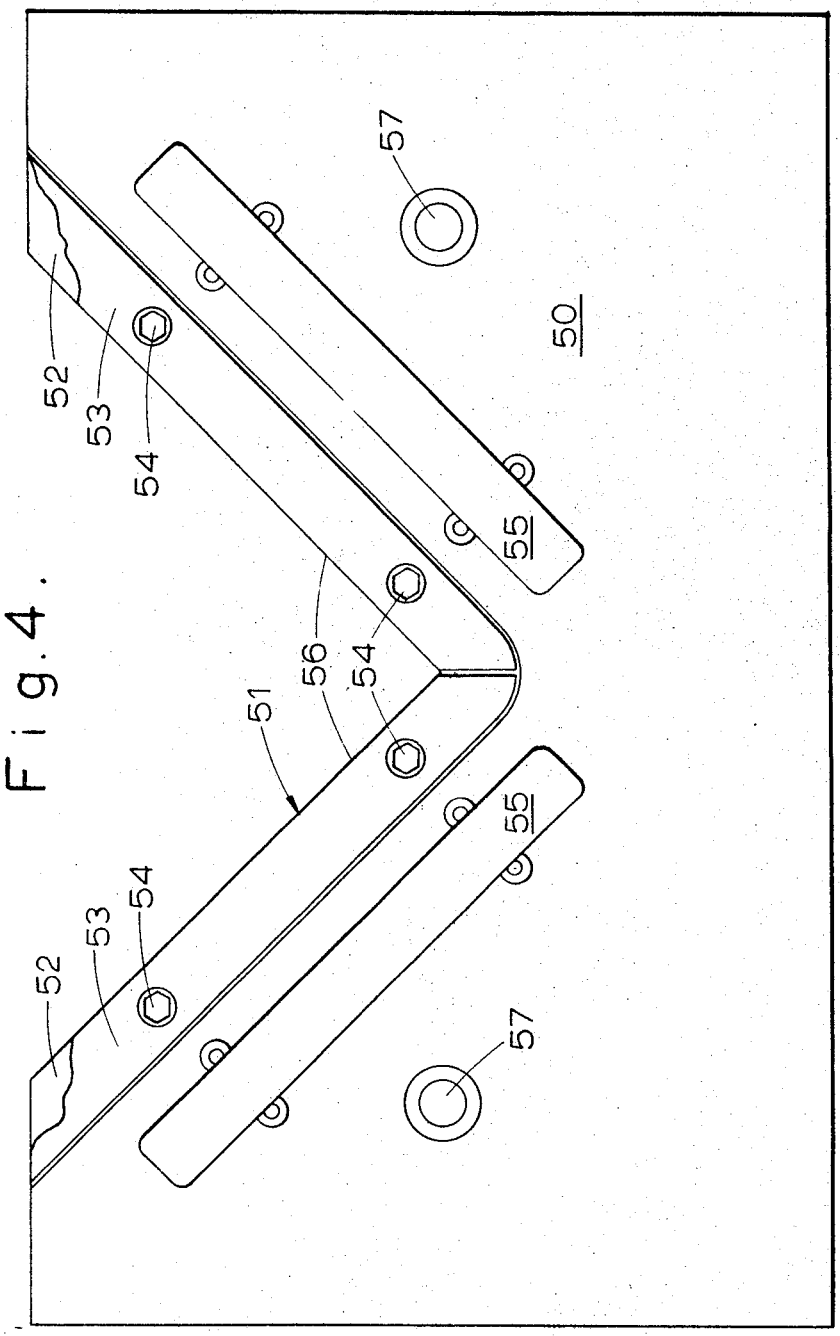

NOTCHING MACHINES

This invention relates to notching machines.

Present notching machines are usually powered by continuously running motors provided with a transmission shaft having a flywheel and a clutch mechanism. The clutch is engaged to drive the cutting head of a ram through a notching cycle. Such machines are usually contructed throughout of very substantial material in view of the high loadings involved during the short period while the machine is actually notching thick steel plate or the like, coupled with the necessity for maintaining accurate mutual location of the two sets of notching blades to obtain a clean shearing cut. Present machines are for the same reason also limited to cutting one particular shape of notch.

An object of the present invention is to provide a notching machine whose arrangement makes more efficient use of heavy contructional materials, this leading to further advantages as will become clear.

According to the present invention there is provided a notching machine comprising a work table, a die plate secured to said table and carrying a lower notching blade, a ram carrying an upper notching blade for shearing co-operation with said lower blade, said ram being supported and guided for rectilinear movement by means of a ram housing secured to and extending beneath said table, drive means for driving said ram downward to effect such shearing, said drive means including a drive transmission shaft extending transversely of said housing, and said housing including members extending from said table and journalling said drive transmission shaft.

An embodiment of the invention will now be described, by way of example, with reference to the accompanying drawings, in which:

FIG. 3 is a perspective view of the ram housing and work table; and

FIG. 4 is a top plan view of the die plate.

Figure 1:
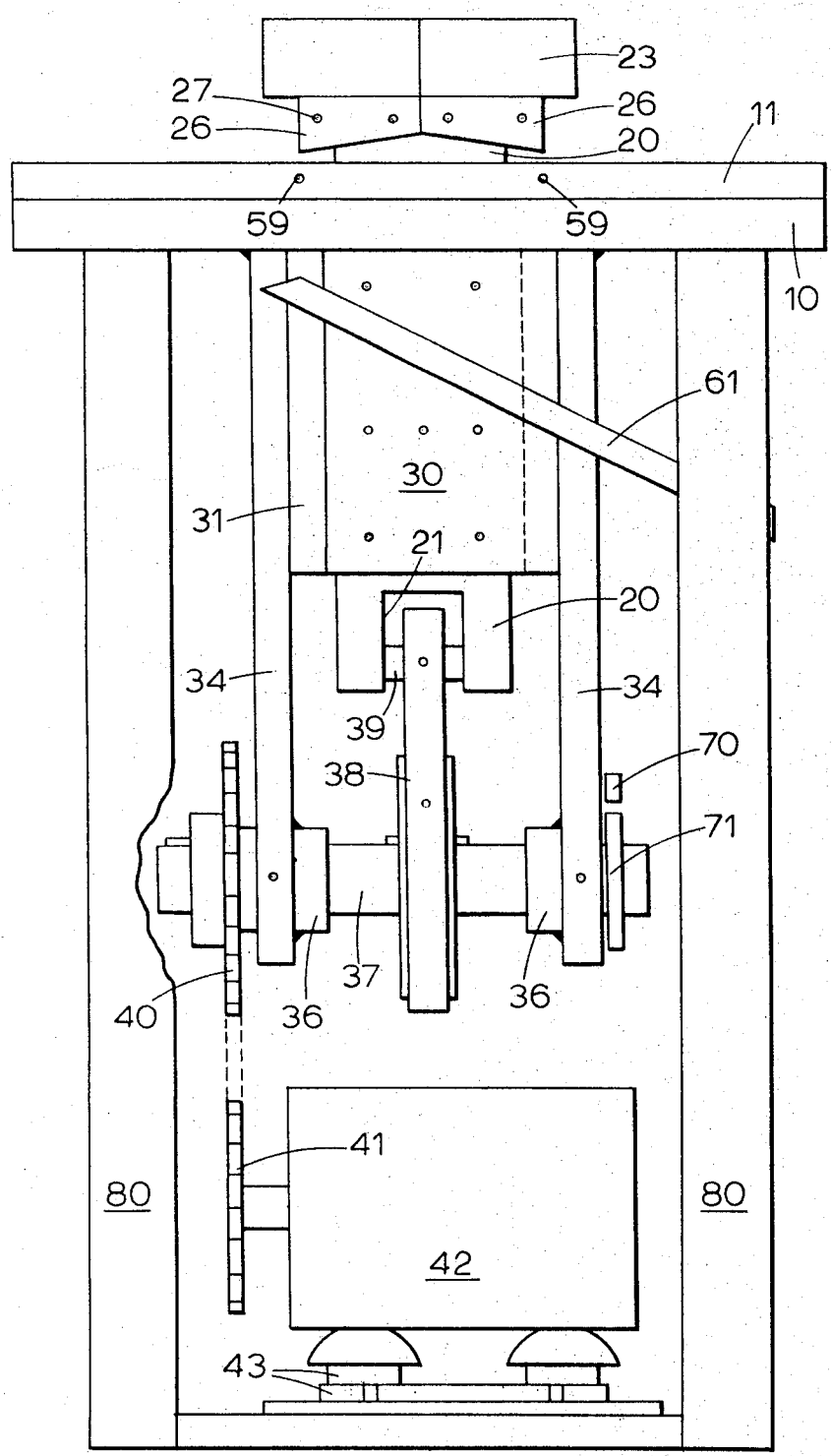
FIG. 1 is a front view with the front cover removed of a notching machine according to the invention.

Referring firstly to FIGS. 1 and 3 there is shown a notching machine comprising a work table constructed as a bottom table 10 and a top table 11 secured together by bolts, one of which is shown at 12. The lower table has an opening 13 the same shape as a ram head to be described with reference to FIG. 2. The upper table has an opening 14 to accomodate passage of the ram head and also to receive a die plate to be described with reference to FIG. 4.

A strong square box section housing is secured to and depends beneath the table 10. The housing is formed of four mutually perpendicular substantial steel plates welded alternate edge to a face adjacent an edge to form the square cross-section tubular housing. Two of these plates 30, 31 are visible in FIGS. 1 and 3. A self-lubricating metal bearing shim 32 is secured to each of the four internal faces of the housing and extends the full height of the housing. The shims are each secured by a plurality of screws 33 permitting fine adjustment of shim position.

Two further substantial steel plates 34 are welded to lie in area contact with an opposed pair of the box section housing plates and extend from the top thereof to a point well below the plates 30, 31. The upper edges of the four housing plates and plates 34 are machined and welded to the under side of table 10.

The lower ends of the plates 34 are bored at 35 and have bosses 36 welded thereto. The bores and bosses receive self-lubricating metal bearings to journal a drive transmission shaft 37. Shaft 37 carries an eccentric 38 drivingly keyed thereto and which in turn is pivotally coupled by a small end shaft 39 to the lower end of the ram of FIG. 2. The drive transmission shaft 37 carries a sprocket wheel 40 chain driven from a sprocket 41 on the output shaft of an electric motor 42 adjustably mounted on plates 43, as shown schematically in FIG. 1. The motor 42 is of the type adapted to transmit full load rapidly and for short periods, a typical notching cycle of this machine enduring for about one second.

Figure 2:
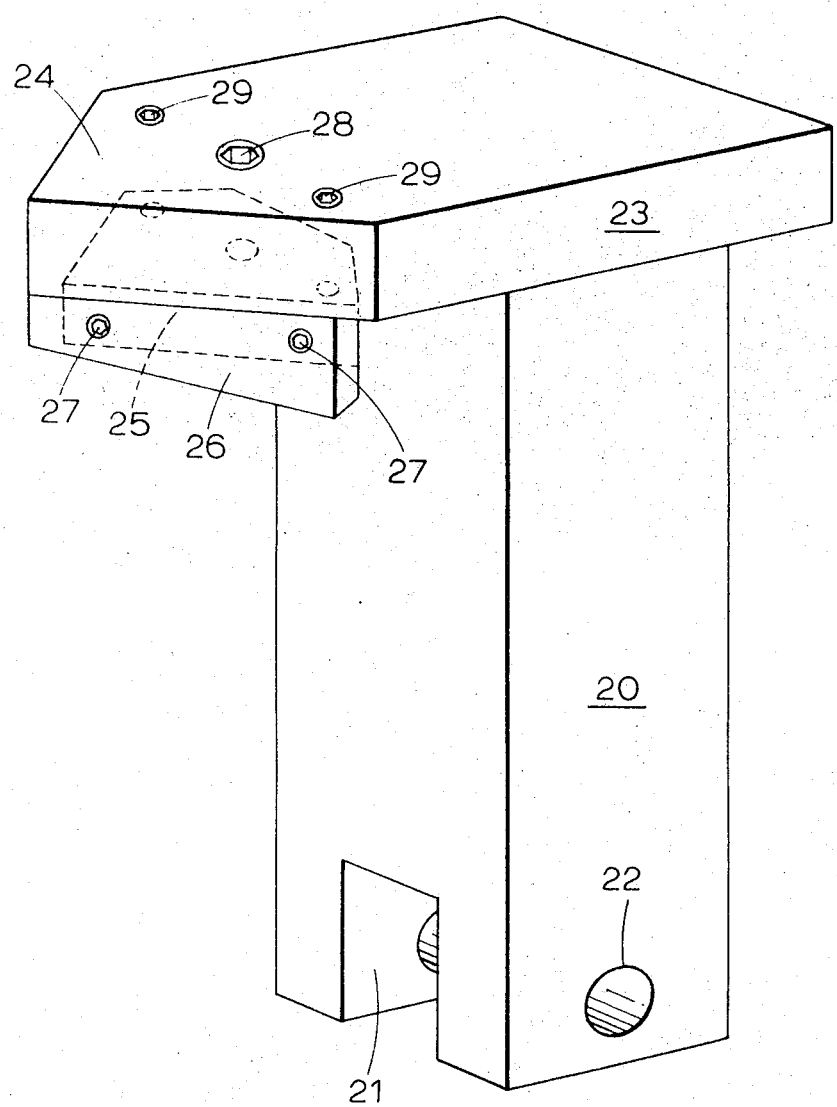
FIG. 2 is a perspective view of the ram and ram head.

Referring now to FIG. 2 there is shown a ram 20. The ram is preferably fabricated from a single solid square section steel shaft, though this may be hollowed or recessed if desired, or even be of thick plate welded fabrication. The lower end is recessed at 21 and transversely bored at 22 to journal the described small end shaft 39. The upper end has a ram head 23 welded thereto having a triangular, or other shaped, projecting portion 24. A blade holder shown in dotted line at 25 is secured to the under side portion 24 and has two upper notching blades 26 secured thereto by screws 27. The blades have inclined shearing edges as shown in FIG. 1 to provide the desired shearing action with the bottom blade to be described.

The blade holder 25 is removably secured to the head 23 by means of a central clamping bolt 28 extending through the ram head into a parallel sided threaded bore in the blade holder. Two spaced apart slightly tapered locating threaded bores are also provided and two tapered locating screws 29 extend through the ram head to work therein accurately to locate the blade holder relative to the ram head. This facilitates ready removal and replacement of the blade holder. It will be appreciated that differently shaped blade holders, carrying blades adapted to cut differently shaped notches, may readily be used, provided only that they are provided with the three appropriate bores as just described.

Referring now to FIG. 4 there is shown a cast iron die plate 50. The plate is received in use in the rectangular portion of opening 14 in table 11, and is of such thickness that the table 11 and plate 50 have upper surfaces lying in a common plane. The die plate has a recess 51 therein bounded by a rebate 52 to provide support for the bottom blades 53. The blades 53 are screwed to rebates 52 by screws 54 working in threaded bores in the rebate. Graduated rules 55 are optionally provided secured to the die plate parallel to the shearing edges 56 of the bottom blades 53.

The die plate 50 is removably secured to the bottom table 10 by means of two clamping bolts 57 extending through the die plate into threaded bores in the table 10. Three pairs of adjusting screws are provided, 58, 59 and 60. These all work in threaded bores extending laterally within the top table 11 and enter the opening 14 to engage the peripheral wall of the die plate 50. In use the clamping bolts 57 are firstly not fully tightened, and appropriate ones of the screws 58, 59 and 60 are ajusted accurately to locate and hold the die plate so that its blades 53 are in the precisely desired shearing co-operation with the upper blades 26. The bolts 57 are then finally tightened. A fourth pair of screws opposite screws 59 is not necessary because the shearing action of notching in use tends to load the blades and plate always towards screws 59.

The tables 10, 11 are supported by a relatively light framework 80 of any suitable construction. A waste chute 61 for metal notched out is provided between the front face of the frame and the box section housing. The waste falls through table openings 13 and 14 into the chute. A foot pedal, not shown, is preferably provided to control operation of the machine, leaving the operators hands free to guide the metal plate being notched. A finger guard and work piece guide stops may be provided on the top table as will be appreciated, by those in the art.

In operation the motor is started and rotates the drive transmission shaft 37 through a single full revolution. This drives ram 20 downwardly to carry the upper blades 26 from an uppermost rest position in a shearing action down past the lower blades 53 and then returns to the rest position. This single cycle of notching is conveniently controlled by a microswitch 70 operated by a cam 71 carried for rotation with shaft 37. The switch 70 senses completion of a single revolution of shaft 37 and sends a stop signal to the motor control.

It will be seen that the full loading between the pairs of blades during shearing is absorbed in a direct manner through the steel plates 34. Specifically, downward thrust on blades 53 during notching is transmitted by the work table directly in compression down through plates 34 to the driving shaft 37. This is of relatively short span between the plates 34. The balancing path is that the upward loading on blades 27 acts in tension directly downwardly through the ram 20 and eccentric 38 to the mid span of the same shaft 37. This compact and direct arrangement of absorbing the working loading has the advantage of considerable economy of material in that the other frame members of the machine can be relatively light. Coupled with the above is the need for accurate location of the sets of blades relative to one another. This is also efficiently and effectively accomplished by the described arrangement. The same plates 34 are directly adjacent the ram guide housing, and both ram and housing are of square cross-section.

Furthermore the described construction which provides an effiecient, compact and closed load transmission path, and effective mutual location of ram head and work piece table, also permits and renders possible the adoption of interchangable blade holders as described. It will be appreciated that blade holder 25 and die plate 50 need to be changed in associated pairs to provide different shaped notching ability.

I claim:

1. A workpiece notching machine comprising a work table have an opening, a die plate, means securing said die plate to said table, a lower notching blade carried by said die plate, a ram extending normal to and through said work table opening and having elongate side faces, an upper notching blade carried by said ram above said work table and positioned for shearing cooperation with said lower notching blade, tubular housing means supporting said ram side faces and guiding said ram in rectilinear movement, said tubular housing means comprising massive housing walls having upper edges secured to said work table, said housing walls extending downwardly from said work table in close supporting and guiding relation with each said elongate side face of said ram over a substantial continuous vertical length of each side face of said ram, whereby to provide for maintenance of accurate relative location of said upper and lower notching blades during a notching cycle, drive means for driving said ram downwardly closely guided and supported by said housing means to effect such shearing of a workpiece between said upper and lower notching blades, said drive means including a drive transmission shaft extending transversely of said ram housing means, and said housing means including further massive wall members extending downwardly from said table closely adjacent said ram and having upper edges secured to said work table, said further massive wall members being provided with journal means journalling said drive transmission shaft, and means drivingly connecting said shaft to said ram, said connecting means being disposed intermediate said further massive wall members, whereby during a notching cycle the loading between said blades is taken in a short efficient closed load path from said upper blade straight down said ram and connecting means, a short distance each way along said shaft and straight back up said housing means to said work table and said lower blade.

2. A workpiece notching machine according to claim 1 wherein said ram is of a generally square cross-section, and said ram housing means is of a similar internal cross-section.

3. A workpiece notching machine according to claim 2 wherein said massive walls of said tubular housing means comprises four plate members perpendicular to said work table and secured adjacent appropriate edges to form said tubular housing.

4. A notching machine according to claim 1 wherein said connecting means comprises an eccentric carried by said drive transmission shaft, and means pivotally coupling said eccentric to said ram to convert rotary motion of said drive transmission shaft into said rectilinear movement of said ram.

5. A notching machine according to claim 1 wherein said means for securing said die plate to said table constitute detachable securing means.

6. A notching machine according to claim 5 wherein said die plate securing means comprises clamping bolts extending through said die plate into threaded bores in said table and wherein a plurality of adjusting screws are provided working laterally in said table to permit fine adjustment of said die plate lateral position before final tightening of said clamping bolts.

7. A notching machine according to claim 5 wherein said work table is recessed to accomodate said secured die plate with the upper surfaces of said work table and said die plate being in a common plane.

8. A notching machine according to claim 1 including blade holder means carrying said upper notching blade, and means detachable securing said blade holder means to the head of said ram.

9. A notching machine according to claim 8 wherein said blade holder securing means comprises a clamping bolt extending through said ram head into a threaded bore in said blade holder.

10. A notching machine according to claim 9 including locating pins extending between said blade holder and said ram head and capable of locating said blade holder relative to said ram head during final tightening of said clamping bolt.

11. A notching machine according to claim 1 wherein said driving means for said ram is an electric motor operative only during said notching cycle.

* * * * *